United States Patent
Bjorklund et al.

[11] 4,040,718
[45] Aug. 9, 1977

[54] POLARIZATION ROTATOR BASED ON DISPERSION DUE TO TWO-PHOTON TRANSITIONS

[75] Inventors: Gary Carl Bjorklund, West Windsor; Paul Foo-Hung Liao, Middletown, both of N.J.

[73] Assignee: Bell Telephone Laboratories, Incorporated, Murray Hill, N.J.

[21] Appl. No.: 646,425

[22] Filed: Jan. 5, 1976

[51] Int. Cl.² .............................................. B01F 1/01
[52] U.S. Cl. .................. 350/147; 350/160 R
[58] Field of Search ........... 350/147, 154, 157, 160 R, 350/160 P

[56] References Cited

U.S. PATENT DOCUMENTS 3,864,020  2/1977  Armstrong et al. ................. 350/157

OTHER PUBLICATIONS

Grischkowsky et al. "Adiabatic Following Model for Two-Photon Transitions: Nonlinear Mixing & Pulse Propagation" Physical Rev. A, Dec. 1975, pp. 2514-2533.
Grischlowsky et al., "Self-Induced Adiabatic Rapid Passage" Phys. Rev. A, Sept. 1975, pp. 1117-1120.
Liao et al., "Polarization Rotation Induced by Resonant Two-Photon Dispersion" Phys. Rev. Lett. Mar. 15, 1976, pp. 584-587.
Grischkowsky D., "Adiabatic Following & Slow Optical Pulse Propagation in Rubidium Vapor," Phys. Rev. A, June 1973, pp. 2096-2102.
Bonch-Bruevich et al., Jet P Letters, vol. 3, June 1966, pp. 279-281.
Gibbs et al., Optics Communications, vol. 12, Dec. 1974, pp. 396-399.
Power, E. A. Jr. of Chem. Phys., vol. 63, Aug. 15, 1975, pp. 1348-1350.
Grischkowsky, D., Applied Physics Letters, vol. 25, Nov. 15, 1974, pp. 566-568.
Loy, M. M. T., Applied Physics Letters, vol. 26, Feb. 1, 1975, pp. 99-101.
Bjorkholm et al., Applied Physics Letters, vol. 26, May 15, 1975, pp. 564-566.

*Primary Examiner*—John K. Corbin
*Assistant Examiner*—Wm. H. Punter
*Attorney, Agent, or Firm*—Wilford L. Wisner; David I. Caplan

[57] ABSTRACT

An optical polarization rotator is implemented without any magnetic field by using dispersion due to two-photon transitions. The polarization rotator is useful for powerful coherent linearly-polarized optical beams. A second powerful circularly-polarized coherent optical beam provides control for the polarization rotation of the linearly-polarized beam which interacts more strongly with the oppositely circularly-polarized component of the first beam than with the other component of the first beam. The difference in interaction occurs because the gaseous medium atoms in the cell in which the interaction occurs begin and end a nearby resonance transition that determines the two-photon dispersion in the same angular momentum state; and, because of this quantum state selection rule, the result is a relative delay between the two circularly-polarized components of the linearly-polarized beam and a consequent rotation of the orientation of linear polarization.

5 Claims, 1 Drawing Figure

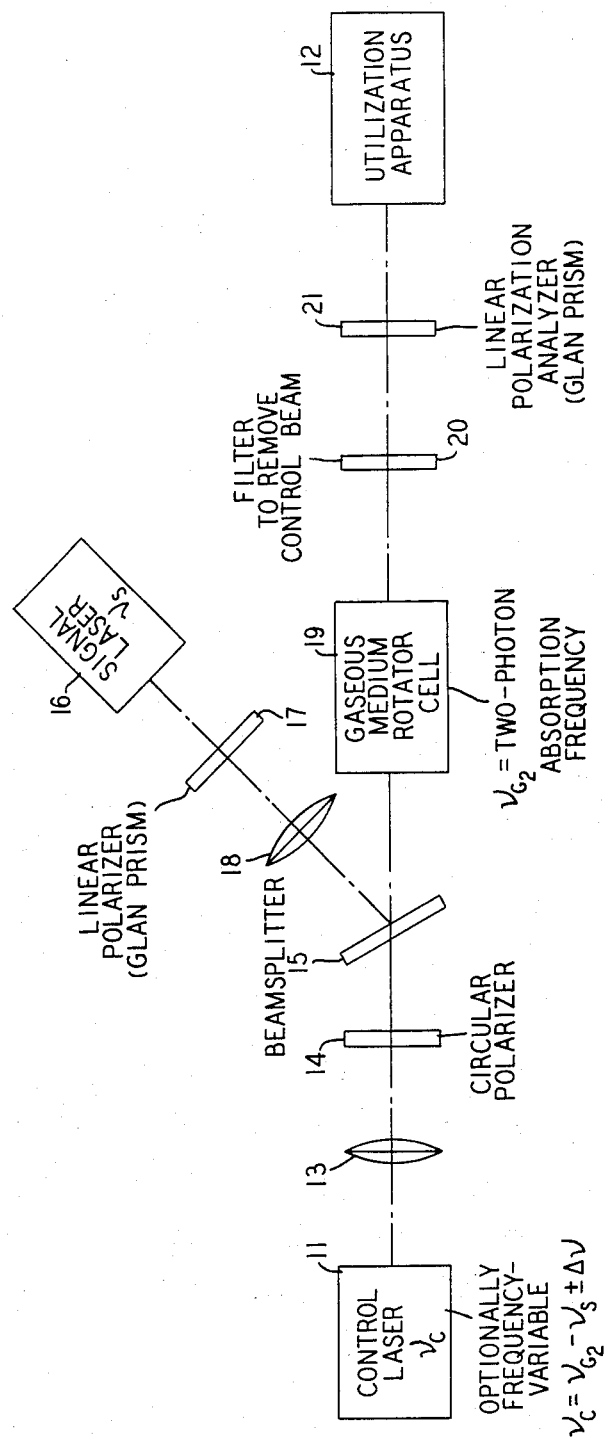

POLARIZATION ROTATOR BASED ON DISPERSION DUE TO TWO-PHOTON TRANSITIONS

BACKGROUND OF THE INVENTION

This invention relates to means for rotating the plane of polarization of linearly-polarized optical beams without the aid of magnetic fields.

Polarization rotators, sometimes called Faraday rotators because of their use of magnetic fields in the prior art, are a useful control device in an optical apparatus; specifically, they can be an alternative to electrooptic modulators.

Nevertheless, the use of magnetic fields is cumbersome, slow and relatively expensive because of the nature of equipment required for supplying the magnetic control fields.

Therefore, it would be useful to have a new way to obtain a pure rotation of linear polarization of a light beam by any selected angle without the use of a magnetic field.

SUMMARY OF THE INVENTION

According to our invention we have devised a polarization rotator for powerful linearly-polarized coherent optical beams of arbitrary frequency in which a second powerful circularly-polarized coherent optical beam eliminates the need for any magnetic field in achieving the rotation. Our invention is based on our recognition of the relevance of a selection rule that applies to two-photon dispersion in an atomic vapor such as sodium.

Specifically, according to a feature of our invention, when the sum of the frequencies of the two beams is sufficiently close to a two-photon resonance of the atomic vapor in a suitable gaseous medium rotator cell, the circularly-polarized control beam interacts more strongly with the oppositely circularly-polarized component of the linearly-polarized beam to be rotated than with the other circularly-polarized component of that beam. A relative delay between the two circularly-polarized components of the linearly-polarized beam occurs; and a consequent rotation of linear polarization of the linearly-polarized beam results.

More specifically, our discovery of the relevance of the selection rule resides in the recognition that the difference in interaction of beam components occurs because the gaseous medium atoms must begin and end the nearby resonance transition that determines the two-photon dispersion in the same angular momentum quantum state. That state is one of zero orbital angular momentum.

BRIEF DESCRIPTION OF THE DRAWING

Further features and advantages of our invention will become apparent from the following detailed description, taken together with the drawing, in which the sole FIGURE shows partially in pictorial form and partially in block diagrammatic form a preferred embodiment of a polarization rotator according to our invention.

DESCRIPTION OF ILLUSTRATIVE EMBODIMENT

In the embodiment of the drawing it is desired to rotate the orientation of the linear polarization of the radiation from a signal laser 16 so that a modulation signal may be received at utilization apparatus 12, the modulation corresponding to the control modulation provided via a control laser 11.

The rotation of linear polarization is provided in a gaseous medium rotator cell 19 without the aid of any applied magnetic field by employing the two-photon dispersion of the gaseous medium of cell 19. In other words, the sum of the frequencies $\nu_c$ and $\nu_s$ of the control and signal lasers respectively is sufficiently close to $\nu_{G_2}$, the two-photon absorption frequency, so that substantial dispersion for the two frequencies exists in the gaseous medium of cell 19.

The radiation from the control laser source 11 is applied to cell 19 through a focusing lens 13, a circularly-polarizer 14 and beam splitter 15, all of conventional type. The radiation from signal laser source 16 is applied through a linear polarizer 17, typically a Glan prism, and through a focusing lens 18 to be reflected at least in part, from beam splitter 15. To improve the efficiency of the system, beam splitter 15 may optionally be a dichroic beam splitter, inasmuch as the frequencies $\nu_c$ and $\nu_s$ will typically be sufficiently different; or the two beams may enter the cell 19 at a slight angle and intersect inside the cell 19, so that they will be separated in angle at the output and may be used separately.

Relatively powerful beams from the two sources 11 and 16 are passed essentially collinearly through cell 19. The control beam is removed by filter 20, so that the linear polarization analyzer 21 may operate solely on the radiation of rotator polarization from source 16, and so that a correspondingly modulated radiation of linear polarization will be received at utilization apparatus 12.

In our first experimental embodiment of our apparatus of the drawing, the polarization rotator was demonstrated as utilizing the dispersion associated with the 3S-5S two-photon transitions in sodium vapor in cell 19. The apparatus of the drawing, when analyzer 21 is present, may be viewed over all as a rapid optical shutter, a more complex organization of parts than a simple polarization rotator.

In the operation of the apparatus of the drawing, rotation of the polarization direction of a linearly-polarized dye laser beam of wavelength $\lambda_s$ (signal laser) is produced with a circularly-polarized, control laser beam of wavelength $\lambda_c$.

Devices which utilize the dispersion associated with single-photon transitions in atomic or molecular vapors have been previously demonstrated. H. M. Gibbs et al., *Optics Communications*, Volume 12, page 396 (1974) have reported Faraday rotation angles in excess of 180° which were produced in sodium vapor in a 1 KOe magnetic field. In contrast, our apparatus uses no magnetic field.

Resonant birefringence due to optically induced level shifts was reported by A. M. Bonch-Bruevich et al., *J.E.T.P. Letters*, Volume 3, page 279 (1966). In contrast, our apparatus produces a pure rotation of angle of linear polarization of any value, unlike that achievable in a birefringent device.

Recently the large dispersion available with near resonant atomic and molecular transitions has also been used to produce pulse compression and the conversion of cw light into pulses by D. Grischkowsky, *Applied Physics Letters*, Volume 25, page 566 (1974), M. T. Loy, *Applied Physics Letters*, Volume 26, page 99 (1974) and J. E. Bjorkholm et al., *Applied Physics Letters*, Volume 26, page 564 (1975). In U.S. Pat. No. 3,864,020, issued Feb. 4, 1975, J. A. Armstrong and D. Grischkowsky have proposed an optical modulator employing a circularly-polarized modulating beam; but, by relying on Zeeman splitting, they have failed to recognize the possibility of a magnetic-field-free polarization rotator utilizing the above-stated selection rule.

A major limitation of using single-photon dispersion is the requirement of a near-resonant atomic or molecular transition. We have recognized that this restriction can be considerably relaxed when one uses two-photon transitions. In a two-photon transition we can picture the control laser beam at frequency $\nu_c$ as inducing the atom to exhibit an absorption resonance at $\Omega - \nu_c$, where $\Omega$ is the two-photon transition frequency. From the Kramers-Dronig relationships one finds a dispersion associated with this induced absorption resonance. The resonance frequency of this induced absorption can be adjusted by adjusting the control laser frequency, $\nu_c$, as contrasted to the change of the signal frequency, $\nu_s$, which is usually not desired to be extensively adjusted; and hence the restriction of a chance coincidence with atomic transition frequencies is removed.

The polarization rotator reported here makes use of the quantum state selection rules for two-photon absorption. In particular, the selection rules for S to S transitions, S states having zero orbital angular momentum, in atomic vapors are such that if circularly-polarized photons are used, the two absorbed photons must have opposite senses of circular polarization. Therefore, if the control laser beam at $\nu_c$ is circularly-polarized, the two-photon S to S transition will affect only one of the two circularly-polarized components of the linearly-polarized signal beam at $\nu_s$. By correctly adjusting $\nu_c$ such that $\Omega - \nu_c$ is nearly equal to $\nu_s$, the two-photon dispersion can produce a considerable phase shift for the one circularly-polarized component of $\nu_s$ while avoiding significant absorption of either beam. The result is a simple rotation of the direction of linear polarization of the beam at $\nu_s$. This rotation is similar to that obtained with a Faraday rotator; however, a magnetic field is not required. Because it is an electronic effect, the speed of the device is limited only by the temporal properties of the control beam pulse.

The rotation angle in radians is given by $$\Phi = \frac{16\pi^3 l N}{h^3 c^2} \left| \Sigma_n \mu_{gn} \mu_{ne} \left( \frac{1}{\nu_s - \nu_n} + \frac{1}{\nu_c - \nu_n} \right) \right|^2 \times \frac{\nu_s}{\Omega - (\nu_s + \nu_c)} I \quad (1)$$

where $I$ is the intensity of the control laser, $l$ is the length of the vapor cell, $N$ is the vapor density, $\Omega$ is the frequency of the two-photon resonance, $h$ is Planck's constant, $\mu_{gn}$, $\mu_{ne}$ are dipole matrix elements and the sum is taken over all intermediate states with energies $E_n = h\nu_n$. In deriving this expression it is assumed the atomic and laser linewidths are small compared to $|\nu_s - \nu_n|$, $|\nu_c - \nu_n|$, and $|\Omega - (\nu_s + \nu_c)|$.

The control and signal beams were generated by two dye lasers which were simultaneously pumped with a single $N_c$ laser. The signal was tuned at 5891A and the control laser at 6159A i.e., 1A from both the $3P_{3/2}$ intermediate state resonance and the $3S \rightarrow 5S$ two-photon resonance. The bandwidth of each laser was approximately 0.2A. After passing through appropriate polarizers the two beams were combined with a beam splitter and passed collinearly through approximately 5 cm of $3.2 \times 10^{14}/cm^3$. The vapor was contained with 7 Torr of argon buffer gas. The control beam was focused to about a 1 mm spot diameter, while the signal beam was focused to approximately 0.2 mm so that there would be a fairly uniform rotation of the signal beam polarization. At the location of the sodium vapor cell, the total peak powers of the control beam and signal beam were $7.8 \times 10^3$ watts (peak power density $6 \times 10^5$ watts/cm$^2$) and 40 watts (peak power density $5.5 \times 10^4$ watts/cm$^2$), respectively. After passing through the vapor, the signal beam was isolated with a filter and its polarization analyzed with a Glan polarizer.

The wavelengths of the two lasers could be adjusted for (1) strong resonant enhancement of the two-photon transition by tuning the signal beam close to the $3S_{1/2}$-$3P_{3/2}$ or $3S_{1/2}$-$3P_{1/2}$ intermediate state resonance and (2) strong dispersion by tuning the control laser such that the sum frequency is close to the $3S_{1/2}$-$5S_{1/2}$ two-photon resonance. For the typical operation of the polarization rotator of the drawing, we prefer to avoid strong intermediate state resonance and rely solely on the second condition yielding strong two-photon dispersion. Self-focusing and self-defocusing effects due to both the single-photon and the two-photon transitions were clearly evident when tuned close to either the single or two-photon transitions. These effects are a power handling limitation in the present device.

The dependence of rotation angle on control beam intensity is seen to be linearly proportional to the control laser intensity with a slope of $3.1 \times 10^{-5}$° per Watt/cm$^2$. This value is in good agreement with a calculated $1.6 \times 10^{-5}$° per Watt/cm$^2$. The effects of self-focusing or defocusing have not been taken into account in our calculation.

It is interesting to compare the rotation angle or equivalently the phase retardation which is measured here with that obtained with the electronic optical Kerr effect in glass. The phase retardation of $3.1 \times 10^{-5}$ degrees per Watt/cm$^2$ for a path length of 5 cm corresponds to an optical Kerr coefficient, $n_{2B}$ of $2.3 \times 10^{-10}$ esu. This value can be compared to, and is a thousand times larger than, that in glass of $2 \times 10^{-13}$ esu. The large increase in the bulk nonlinear coefficient over that of glass is achieved in spite of a Na density seven to eight orders of magnitude less than for solids and is a consequence of the resonant enhancement of the two-photon dispersion. The maximum transmission is about 40 percent. However, transmission up to 70 percent has been observed with this "shutter" in the open condition and less than 0.1 percent in the "closed" position. The latter was limited only by the quality of the polarizers.

Tuning the control laser wavelength can provide a tunable filter based on the apparatus of the drawing. For example, the signal laser is tuned to 5890.55A. The resonant character of the observed dispersion is clearly evident and in good qualitative agreement with theory. The data shows a reproducible asymmetry about the wavelength of exact two-photon resonance. The rotation angles and the transmission on the short wavelength side of resonance are smaller than those obtained for an equal mistuning on the long wavelength side. This asymmetry probably results from self-focusing effects. Both the two-photon and the single photon transitions lead to self-defocusing for short wavelengths, while on the long wavelength side the two-photon contribution and single photon contribution tend to cancel. More detailed experiments investigating these effects are in progress.

This polarization rotator is based on a nonreciprocal effect. Therefore, it can be used in conventional manner in an optical isolator.

What is claimed is:

1. A magnetic-field-free polarization rotator comprising an atomic gaseous medium, means for applying to said medium a linearly-polarized beam to be polarization rotated, said beam of arbitrary frequency not coinciding with a single-photon resonance of said medium, means for applying to said medium a circularly-polarized beam of frequency complementary to that of the first beam for generating two-photon dispersion and of a power level sufficient for substantial dispersion, the frequencies and polarizations of the linearly-polarized and of the circularly-polarized beams being appropriate for determining interaction of the beams according to a quantum state selection rule, and optical filter means at the output of the rotator for removing any residual portion of the applied circularly-polarized beam, the sum of the frequency of a photon of the linearly-polarized beam and the frequency of a photon of the circularly-polarized beam being at least approximately equal to a two-photon resonance transition frequency of said atomic gaseous medium.

2. A polarization rotator according to claim 1 in which the sum frequency is detuned by a selected amount from the two-photon resonance.

3. A polarization rotator according to claim 1 in which both frequencies are such as to avoid any significant intermediate state resonance, further comprising utilization means for utilizing the optical output of the filter means and a linear optical polarization analyzer located in the optical path before said utilization means.

4. A polarization rotator according to claim 3 in which the power of the circularly-polarized beam per unit beam cross-section in the medium is $I_1$ Watts/unit area, where the necessary value of $I_1$ is determined from $$\Phi = \frac{16\pi^3 l N}{h^3 c^2} \left| \Sigma_n \mu_{gn} \mu_{ne} \left( \frac{1}{\nu_s - \nu_n} + \frac{1}{\nu_c - \nu_n} \right) \right|^2 \times \frac{\nu_s}{\Omega - (\nu_s + \nu_c)} I_1 \quad (1)$$

$I_1$ is the intensity of the control beam, $l$ is the length of the medium, $N$ its density, $\Omega$ is the frequency of the two-photon resonance, $h$ is Planck's constant, $\mu_{gn}$ and $\mu_{ne}$ are the dipole matrix elements and $\nu_c$ and $\nu_s$ are the frequencies of the circularly-polarized control beam and the linearly-polarized signal beam, respectively.

5. A polarization rotator according to claim 1 in which the atoms of the gaseous medium begin and end the two-photon transition with the same angular momentum quantum state of zero orbital angular momentum.

* * * * *